US008285817B1

(12) United States Patent
Balasubramanian et al.

(10) Patent No.: US 8,285,817 B1
(45) Date of Patent: Oct. 9, 2012

(54) MIGRATION ENGINE FOR USE IN A LOGICAL NAMESPACE OF A STORAGE SYSTEM ENVIRONMENT

(75) Inventors: Shankar Balasubramanian, Bangalore (IN); K. Uday Kishore, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 1365 days.

(21) Appl. No.: 11/384,804

(22) Filed: Mar. 20, 2006

(51) Int. Cl.
 *G06F 15/16* (2006.01)
(52) U.S. Cl. ........................................ 709/219
(58) Field of Classification Search ............ 719/310, 719/317, 319; 707/200; 709/202, 203, 217–219, 709/249; 717/173; 715/748, 770; 714/746
See application file for complete search history.

(56) References Cited

U.S. PATENT DOCUMENTS

| 4,156,907 A | 5/1979 | Rawlings et al. |
| 4,399,503 A | 8/1983 | Hawley |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,301,350 A * | 4/1994 | Rogan et al. ............. 705/33 |
| 5,426,747 A | 6/1995 | Weinreb et al. |
| 5,568,629 A | 10/1996 | Gentry et al. |
| 5,581,724 A | 12/1996 | Belsan et al. |
| 5,768,528 A * | 6/1998 | Stumm .................... 709/231 |
| 5,802,312 A * | 9/1998 | Lazaridis et al. .......... 709/238 |
| 5,819,292 A | 10/1998 | Hitz et al. |
| 6,151,608 A | 11/2000 | Abrams |
| 6,173,306 B1 | 1/2001 | Raz et al. |
| 6,516,380 B2 | 2/2003 | Kenchammana-Hoskote et al. |
| 6,601,072 B1 | 7/2003 | Gerken |

(Continued)

FOREIGN PATENT DOCUMENTS

WO    WO 89/10594    11/1989

OTHER PUBLICATIONS

EDI Tips, EDI User Guide, Section 1011, Chapter 2, Date Unknown, p. 1.*

(Continued)

*Primary Examiner* — Andrew Caldwell
*Assistant Examiner* — Melvin H Pollack
(74) *Attorney, Agent, or Firm* — Cesari and McKenna, LLP

(57) ABSTRACT

A migration engine is provided for use in a logical namespace of a storage system environment. A remote agent of an integrated management framework is installed on a host machine of the storage system environment and includes a pre-installed migration plug-in module that configures the agent as a migration engine adapted to provide a data migration capability. That is, the migration plug-in has the intelligence to configure the remote agent as a migration engine adapted to perform data migration from a source location to a destination location in the storage system environment.

26 Claims, 8 Drawing Sheets

U.S. PATENT DOCUMENTS

| | | | |
|---|---|---|---|
| 6,636,879 B1 | 10/2003 | Doucette et al. | |
| 6,643,654 B1 | 11/2003 | Patel et al. | |
| 6,651,074 B1 | 11/2003 | Taylor | |
| 6,654,746 B1* | 11/2003 | Wong et al. | 707/10 |
| 6,662,207 B2* | 12/2003 | Kawamura et al. | 709/202 |
| 6,856,989 B1* | 2/2005 | Zhou et al. | 1/1 |
| 6,973,647 B2* | 12/2005 | Crudele et al. | 717/177 |
| 6,978,282 B1* | 12/2005 | Dings et al. | 707/204 |
| 7,167,965 B2 | 1/2007 | Alvarez et al. | |
| 7,171,468 B2* | 1/2007 | Yeung et al. | 709/225 |
| 7,194,597 B2 | 3/2007 | Willis et al. | |
| 7,210,131 B2 | 4/2007 | Schmidt et al. | |
| 7,263,590 B1 | 8/2007 | Todd et al. | |
| 7,272,600 B1 | 9/2007 | Singh | |
| 7,284,015 B2 | 10/2007 | Pudipeddi et al. | |
| 7,287,063 B2* | 10/2007 | Baldwin et al. | 709/216 |
| 7,293,282 B2* | 11/2007 | Danforth et al. | 726/4 |
| 7,313,560 B2* | 12/2007 | Dilley et al. | 707/100 |
| 7,337,197 B2 | 2/2008 | Wilson et al. | |
| 7,346,664 B2* | 3/2008 | Wong et al. | 709/214 |
| 7,512,636 B2* | 3/2009 | Verma et al. | 1/1 |
| 7,539,704 B2* | 5/2009 | Brodersen et al. | 1/1 |
| 7,546,319 B1* | 6/2009 | Srinivasan et al. | 707/200 |
| 7,590,664 B2 | 9/2009 | Kamohara et al. | |
| 7,613,698 B2* | 11/2009 | Verma et al. | 707/8 |
| 7,783,765 B2* | 8/2010 | Hildebrand et al. | 709/229 |
| 7,818,456 B2* | 10/2010 | Carro | 709/246 |
| 2002/0010783 A1 | 1/2002 | Primak et al. | |
| 2002/0083124 A1* | 6/2002 | Knox et al. | 709/203 |
| 2004/0010795 A1* | 1/2004 | Sasaki et al. | 719/321 |
| 2004/0030668 A1 | 2/2004 | Pawlowski | |
| 2004/0111726 A1* | 6/2004 | Dilley et al. | 719/310 |
| 2004/0122917 A1 | 6/2004 | Menon et al. | |
| 2004/0267830 A1* | 12/2004 | Wong et al. | 707/200 |
| 2005/0044114 A1 | 2/2005 | Kottomtharayil et al. | |
| 2005/0065961 A1* | 3/2005 | Aguren | 707/102 |
| 2005/0154731 A1 | 7/2005 | Ito et al. | |
| 2005/0210074 A1 | 9/2005 | Nakatani et al. | |
| 2005/0240654 A1 | 10/2005 | Wolber et al. | |
| 2005/0246401 A1 | 11/2005 | Edwards et al. | |
| 2005/0289149 A1* | 12/2005 | Carro | 707/10 |
| 2006/0123062 A1* | 6/2006 | Bobbitt et al. | 707/200 |
| 2006/0136735 A1* | 6/2006 | Plotkin et al. | 713/182 |
| 2006/0179153 A1* | 8/2006 | Lee et al. | 709/231 |
| 2007/0055703 A1 | 3/2007 | Zimran et al. | |
| 2007/0088702 A1* | 4/2007 | Fridella et al. | 707/10 |
| 2008/0034205 A1* | 2/2008 | Alain et al. | 713/160 |
| 2008/0228900 A1* | 9/2008 | Gorin et al. | 709/219 |
| 2009/0043754 A1* | 2/2009 | Faris et al. | 707/5 |
| 2009/0172045 A1* | 7/2009 | Cantwell et al. | 707/204 |
| 2010/0251384 A1* | 9/2010 | Yen | 726/27 |
| 2010/0262797 A1* | 10/2010 | Rosikiewicz et al. | 711/162 |
| 2010/0269034 A1* | 10/2010 | Onodera et al. | 715/234 |
| 2011/0055192 A1* | 3/2011 | Tang et al. | 707/706 |

OTHER PUBLICATIONS

Data (D.*) Files for BNU, AIX 6.1 Information, IBM Help, date unknown, pp. 1-2.*

The UUCP Spool Directory Contents, Caldera Group, 2003, pp. 1-3.*

Background, Intelligent Transfer Service, Microsoft Windows Server 2003 Technical Article, Aug. 2002, pp. 1-21.*

Balasubramanian et al., System and Method for Data Migration Management in a Logical Namespace of a Storage Environment, U.S. Appl. No. 11/384,776, filed Mar. 20, 2006, 37 pages.

DCE 1.2.2 DFS Administration Guide and Reference, 1997, published by The Open Group, 1997, 1187 pages.

DataFabrice® Manager 3.2 Administration Guide, 1994-2004, published by Network Appliance, Inc., Sep. 2005, 564 pages.

Kishore et al., System and Method for Integrating Namespace Management and Storage Management in a Storage System Enviroment, U.S. Appl. No. 11/384,711, filed Mar. 20, 2006, 41 pages.

VFM™ (Virtual File Manager) Reference Guide, Version 3.0, 2001-2003, 197 pages.

VFM™ (Virtual File Manager) Getting Started Guide, Version 3.0, 2001-2003, 62 pages.

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CC (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3):407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?(article I have has no date or cite).

Gait, Jason, Phoenix: *A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev C395, presented Jan. 19, 1994.

Hitz, David, et al. *System and Method for Enabling a Storage System to Support Multiple Volume Formats Simultaneously*, U.S. Appl. No. 60/652,626, filed Feb. 14, 2005.

Howard, John H, et al. *Scale and Performance in a Distributed File System*, Carnegie Mellon University, CMU-ITC-87-068, Aug, 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1:91-104, Mar. 1977.

Lorie, RA, *Shadow Page Mechanism*, IBM Technical Disclosure Bulletin, Jun. 1986, pp. 340-342.

Mckusick, Marshall Kirk, et al., *A Fast File System for UNIX*, Computer Science Division, Department of Electrical Engineering and Computer Sciences, Univ of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 267-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington), Published as Operating Systems Review, 19(5):51-52, Dec. 1985.

Muller, Keith, et al., *A High Performance Multi-Structured File System Design*, In Proceedings of the 12th ACM Symposium on Operating Systems Principles, Oct. 1991, pp. 56-67.

Ousterhout, John K. et al., *The Sprite Network Operating System*, Computer Science Division, Department of Engineering of Electrical Engineering and Computer Sciences, Univ. of CA, Berkley Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective on the Sprite Network Operating System*, found at http://www.cs.berkely.edu/projects/sprite/retrospective.html, visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, in Security and Persistance, Rosenber, J. & Keedy, J.L. 9ed). Springer-Verlag (1990) pp. 229-245.

Rosenblum, Mendel, et al., *The LFS Storage Manager*, Computer Science Division, Electrical Engin. and Computer Sciences, Univ. of CA, presented at Summer '90 USENIX Technicl Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, In Proceedings of ACM Transactions on Computer Systems, (10)1:26-52, Feb. 1992.

Sandberg, Russel et al., *Design and implementation of the Sun Network Filesystem*. In Proc Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (1)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon Uinversity, CMU-ITC.

Satyanarayanan, M., et al, *Coda: A highly available file system for a distributed workstation environment*. IEEE Transactions on Computers, 39(4): 447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.oro/panes/doc/UserGuide/auuso004.htm, visited on Mar. 2, 2005.

Welch, Brent B., et al, *Pseudo Devices: User-Level Extensions to the Sprite File System*, Computer Science Divison, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Uinv. of CA, Berkley, Oct. 1989.

Wittle, Mark, et al, *LADDIS: The next generation in NFS file server benchmarking*, USENIX Association Conference Proceedings, Apr. 1983.

\* cited by examiner

| DATA | CATEGORY | | XML TAG |
|---|---|---|---|
| MIGRATION JOB ID | TOP LEVEL DETAILS | | migrate job-id |
| SOURCE | | | source |
| DESTINATION | | | destination |
| MIGRATION POLICY ID | | | policy-id |
| MIGRATION AGENT ID | | | agent |
| STATUS | | | status |
| START TIME | TIME STATISTICS | | start |
| END TIME | | | finish |
| BYTES MIGRATED | BYTE LEVEL STATISTICS | | bytes-mig |
| NUMBER OF DIRECTORIES MIGRATED SUCCESSFULLY | DIRECTORY LEVEL STATISTICS | | dirs-mig |
| NUMBER OF DIRECTORIES FAILED TO MIGRATE | | | dirs-failed |
| NUMBER OF DIRECTORIES MIGRATED BUT WITH SOME ERRORS | | | dirs-mig-with-errs |
| NUMBER OF DIRECTORIES EXCLUDED FROM MIGRATION | | | dirs-excluded |
| NUMBER OF DIRECTORIES SKIPPED FROM MIGRATION | | | dirs-skipped |
| NUMBER OF FILES MIGRATED SUCCESSFULLY | FILE LEVEL STATISTICS | | files-mig |
| NUMBER OF FILES FAILED TO MIGRATE | | | files -failed |
| NUMBER OF FILES MIGRATED BUT WITH SOME ERRORS | | | files -mig-with-errs |
| NUMBER OF FILES EXCLUDED FROM MIGRATION | | | files -excluded |
| NUMBER OF FILES SKIPPED FROM MIGRATION | | | files -skipped |
| START TIME | COPY PHASE | TIME STATISTICS | start |
| END TIME | | | finish |
| DIRECTORY NAME AND OPERATION STATUS | | RECURSIVE DIRECTORY AND FILE LEVEL DETAILS | dir-node |
| FILE/DIRECTORY NAME..1 AND OPERATION STATUS | | | file-node |
| FILE/DIRECTORY NAME..2 AND OPERATION STATUS | | | file-node |
| FILE/DIRECTORY NAME..3 AND OPERATION STATUS | | | file-node |
| STATUS | DFS UPDATE PHASE | TOP LEVEL DETAILS | status |
| OPERATION | | | operation |
| START TIME | | TIME STATISTICS | start |
| END TIME | | | finish |
| START TIME | POST MIGRATION PHASE | TIME STATISTICS | start |

FIG. 8

MIGRATION ENGINE FOR USE IN A LOGICAL NAMESPACE OF A STORAGE SYSTEM ENVIRONMENT

CROSS-REFERENCE TO RELATED APPLICATION

The present invention is related to the following commonly assigned U.S. patent application Ser. No. 11/384,776, titled System and Method for Data Migration Management in a Logical Namespace of a Storage System Environment, filed on Mar. 20, 2006, which application is hereby incorporated by reference.

FIELD OF THE INVENTION

The present invention relates to storage systems, and more specifically, to a migration engine for use in a storage system environment.

BACKGROUND OF THE INVENTION

A storage system typically comprises one or more storage devices into which information may be entered, and from which information may be obtained, as desired. The storage system includes an operating system that functionally organizes the system by, inter alia, invoking storage operations in support of a storage service implemented by the system. The storage system generally provides its storage services through the execution of software modules, such as processes. The storage system may be implemented in accordance with a variety of storage architectures including, but not limited to, a network-attached storage environment, a storage area network and a disk assembly directly attacked to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system may be further configured to operate according to a client/server model of information delivery to thereby allow many clients to access information stored on the system. In this model, the storage system may be embodied as file server executing an operating system, such as the Microsoft® Windows™ operating system (hereinafter "Windows operating system"). Furthermore, the client may comprise an application executing on an operating system of a computer that "connects" to the server over a computer network, such as a point-to-point link, shared local area network, wide area network, or virtual private network implemented over a public network, such as the Internet. Each client may request the services of the server by issuing storage access protocol messages (in the form of packets) to the server over the network. By supporting a plurality of storage (e.g., file-based) access protocols, such as the conventional Common Internet File System (CIFS) and the Network File System (NFS) protocols, the utility of the server is enhanced.

To facilitate client access to the information stored on the server, the Windows operating system typically exports units of storage, e.g., (CIFS) shares. As used herein, a share is equivalent to a mount point or shared storage resource, such as a folder or directory that stores information about files or other directories served by the file server. A Windows client may access information in the directory by mounting the share and issuing a CIFS protocol access request that specifies a uniform naming convention (UNC) path to the share.

The UNC path or pathname is an aspect of a Windows networking environment that defines a way for a client to refer to a unit of storage on a server. The UNC pathname is prefixed with the string \\ to indicate resource names on a network. For example, a UNC pathname may comprise a server name, a share (directory) name and a path descriptor that collectively reference a unit of storage or share. Thus, in order to access the share, the client typically requires knowledge of the specific physical location (i.e., the identity) of the server exporting the share.

Instead of requiring the client to provide the specific identity of the file server exporting the share, it is desirable to only require a logical pathname to the share. That is, it is desirable to provide the client with a globally unique pathname to the share (location) without reference to the file server. The conventional Distributed File System (DFS) namespace service provides such a solution in a Windows environment through the creation of a namespace that removes the specificity of server identity. DFS is well-known and described in DCE 1.2.2 *DFS Administration Guide and Reference*, 1997, which is hereby incorporated by reference. As used herein, a namespace is a view of shared storage resources (such as shares) from the perspective of a client. The DFS namespace service is generally implemented using one or more DFS servers and distributed components in a network.

Using the DFS service, it is possible to create a unique pathname (in the form of a UNC pathname) for a storage resource that a DFS server translates to an actual location of the resource (share) in the network. However, in addition to the DFS namespace provided by the Windows operating system, there are many other namespace services provided by various operating system platforms, including the NFS namespace provided by the conventional Unix® operating system. Each service constructs a namespace to facilitate management of information using a layer of indirection between a file server and cliff accessing a shared storage resource (share) on the server. For example, a share may be connected or "linked" to a link point (link in DFS terminology or a mount point in NFS terminology) to hide the machine specific reference to the share. By referencing the link point, the client can automatically access information on the storage resource of the specific machine. This allows an administrator to store the information on any server in the network by merely providing a reference to the information (or share). However, these namespaces are typically services created on heterogeneous server platforms, which leads to incompatibility and non-interoperability with respect to management of the namespaces by the user. For example, the DFS namespace service is generally limited to Windows-based operating system platforms, whereas the NFS namespace service is generally limited to Unix-based operating system platforms.

The Virtual File Manager (VFM™) developed by NuView, Inc. and available from Network Appliance, Inc., ("NetApp") provides a namespace service that supports various protocols operating on various file server platforms, such as NetApp filers and DFS servers. The VFM namespace service is well-known and described in VFM™ (*Virtual File Manager*) *Reference Guide, Version* 4.0, 2001-2003, and VFM™ (*Virtual File Manager*) *Getting Started Guide, Version* 4.0, 2001-2003.

Movement or "migration" of data is an essential capability of any data management solution. Data migration may be employed for a number of reasons, including (i) load balancing to reduce the load on a particular machine, (ii) reducing access latency by moving data to a machine that is closer to a consumer of the data, or (iii) archiving to move data that has not been used for some time ("stale" data) on a machine of high grade to a machine of lower grade. Data migration thus facilitates improved distribution of storage in a hierarchical manner, as well as relocation of unwanted or stale data automatically.

Broadly stated, previous namespace services (such as the VFM namespace service) facilitate migration (movement) of data from a machine (computer) at a source location to a machine at a destination location using a migration agent in connection with a data migration process. As used herein, the migration agent is software code configured to perform data migration between the machines at the source and destination locations in a network. The migration agent used by these services is generally not pre-installed on the machine involved in the data migration process; rather, these services "push" installation of the migration agent to the machine in the network as and when required.

Often, the migration agent may fail as a result of, e.g., a system crash. The previous services may utilize platform specific tools to convey the cause of the failure or error to a user; such tools are generally complex and not useful in an environment wherein the machines have different ("heterogeneous") operating system platforms, e.g., in a heterogeneous storage system environment. As used herein, a heterogeneous storage system environment may include storage systems having different operating systems, different variants of operating systems and/or different file systems implemented by different operating systems. The present invention is directed, in part, to conveying the cause of migration agent failure in a format that is user friendly and compatible in such a heterogeneous environment.

Furthermore, in response to the migration agent failure, it is possible that the resulting data stored at the destination location may be inconsistent (corrupted) with respect to the original data transferred from the source location. That is, the data stored at the destination location might include a mixture of the original data and additional erroneous data. The present invention is further directed, in part, to reducing the probability of a migration agent failure corrupting data during the migration process.

When the data migration process includes moving data (e.g., a file) between heterogeneous machines at the source and destination locations, there is a further issue of possible loss of data format of the file, as opposed to loss of the actual data content of the file. In this context, data loss denotes loss of file metadata, such as attributes (including security attributes such as access control lists, ACLs), type of file and other information associated with the file, such as alternate data streams (ADS). Here, the type of file includes (i) sparseness of the file and/or (ii) encryption of the file. Often there is a requirement to exactly (strictly) preserve the attribute, type and associated information of the file transferred from the source location to the destination location during the migration process. The present invention is further directed, in part, to a technique for strictly preserving file attributes, type and associated information during data migration.

SUMMARY OF THE INVENTION

The disadvantages of the prior art are overcome by providing a migration engine for use in a logical namespace of a storage system environment. A remote agent of an integrated management framework is installed on a host machine of the storage system environment and includes a pre-installed migration plug-in module that configures the agent as a migration engine adapted to provide a data migration capability. That is, the migration plug-in has the intelligence to configure the remote agent as a migration engine adapted to perform data migration from a source location to a destination location in the storage system environment.

In accordance with the present invention, the migration engine is illustratively embodied as software code that operates within the context of a remote agent process (e.g., of the remote agent) and provides an interface between an architecture of the integrated management framework and an architecture of its host machine. Notably, the internal functionality and security machinery of the migration engine (and remote agent) facilitates portability to multiple operating system platforms of host machines to thereby enable the integrated management framework to manage namespace and storage objects of those machines.

According to an aspect of the present invention, the migration engine reduces the probability of data corruption occurring during data migration by storing a copy of data (e.g., a file) transferred from the source location in a temporary area on the destination location and changing the original name of the transferred file copy. Once the data migration transfer is complete, the file is renamed to its original file name and the file copy is stored at the permanent destination location. Renaming of the file is an atomic operation that protects against failures/crashes corrupting the data in the file. For example, if the migration engine fails, the data stored in the temporary area is deleted. Once the migration engine is restored, a new data migration transfer is started, thus reducing the possibility of inconsistent data on the destination location.

Another aspect of the invention is directed to the format and content of information recorded (logged) by the migration engine during data migration. The migration engine also has the capability of controlling the amount of information that is logged during data migration. The novel logging format provides an intelligent manner of logging information that can be used by an administrator (user) to precisely determine the cause of a failure arising during migration. As a result, the content of the logging information may be particularly useful for auditing purposes.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 8 is a diagram of an exemplary format of information logged by the migration engine in accordance with the present invention.

DETAILED DESCRIPTION OF AN ILLUSTRATIVE EMBODIMENT

A. Storage System Environment

Figure 1:
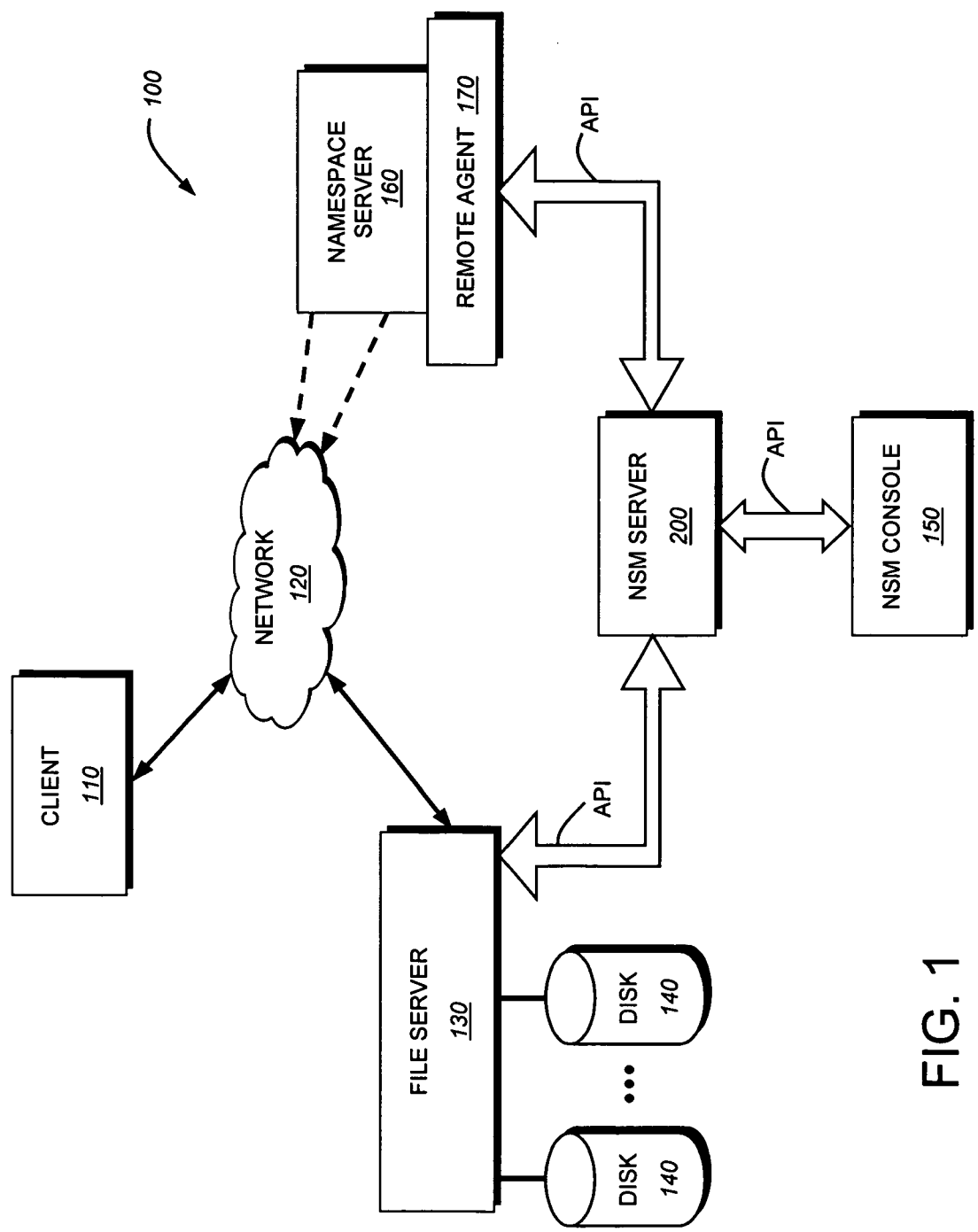
FIG. 1 is a schematic block diagram of an exemplary storage system environment that may be advantageously used with the present invention.

FIG. 1 is a schematic block diagram of an exemplary storage system environment 100 that may be advantageously used with the present invention. The storage system environment comprises a plurality of storage systems configured to provide storage services relating to information stored on storage devices, such as disks 140. The storage systems include file servers 130 executing operating systems such as, e.g., the Microsoft® Windows™ operating system (hereinafter "Windows operating system"), the Unix® operating system and the NetApp® Data ONTAP™ operating system available from Network Appliance, Inc., Sunnyvale, Calif. One or more clients 110 may connect to the file servers over a computer network 120, such as a point-to-point link, shared local area network, wide area network, or virtual private network implemented over a public network, such as the Internet.

Each client 110 may comprise an application executing on an operating system of a general-purpose computer that interacts with the file servers 130 in accordance with a client/server model of information delivery. That is, the client may request the services of a server, and the server may return the results of the services requested by the client, by exchanging packets over the network 120. The client may issue packets including storage (e.g., file-based) access protocols, such as the Common Internet File System (CIFS) protocol or Network File System (NFS) protocol, over the Transmission Control Protocol/Internet Protocol (TCP/IP) when accessing information in the form of, e.g., files and directories.

To facilitate client access to the information stored on the server, a file server 130 executing, e.g., the Windows operating system typically exports units of storage, e.g., (CIFS) shares. A client 110 may access information of the share by mounting the share and issuing a CIFS protocol access request that specifies a uniform naming convention (UNC) path to the share. Although the illustrative embodiment is directed to a Windows file server that is accessed using the CIFS protocol, the invention described herein is not so limited and may also apply to other servers 130, such as Unix filer servers and NetApp filers, that are accessible using other file access protocols, such as the NFS protocol. The client connects to file server 130 when accessing the share, typically by specifying the IP address (or identity) of the file server.

However, instead of requiring that the client know the specific identity of the server in order to access the share, a namespace server 160, such as the conventional Distributed File System (DFS) server, provides a namespace service that removes the specificity of server identity. Using the DFS service, a unique pathname (in the form of a UNC pathname) is created for the share that the DFS server translates to an actual location of the share in the network. Moreover, in a typical Windows environment wherein a group of machines is organized as a domain, a domain controller, such as a primary domain controller (PDC), provides security (e.g., rights, privileges and authentication) services for the machines. Note that the PDC and DFS server may reside on separate machines or, as in the illustrative embodiment described herein, may reside on the same machine as separate services.

For example, assume a client application issues a CIFS request to access information of a share stored on a file server 130 in the environment 100. The request is passed through various layers of the client's operating system including, e.g., a CIFS redirector. Before issuing a CIFS packet directed to a UNC pathname specified by the client application, the redirector contacts a DFS server to determine whether there is a different, actual pathname needed to access the information. At that time, the DFS server performs a PDC lookup operation to determine whether the client has the appropriate privileges to access the data. If so, the actual pathname is provided to the redirector, which then uses that pathname to create the CIFS packet for transmission over the network to the appropriate file server. The DFS namespace service thus provides a level of indirection to a share that resides on a file server 130 in the environment 100. Upon receiving the packet, the file server verifies that the client has the appropriate privileges to access the information.

Although the illustrative embodiment is directed to a DFS namespace service provided by the Windows operating system executing on a DFS server, the invention described herein is not limited and may also apply to other namespace services, such as the NFS namespace provided by the Unix operating system executing on a conventional Name Information Service (NIS) server. Each service constructs a namespace to facilitate management of information using a layer of indirection between a file server 130 and client 110 accessing a shared storage resource (share) on the server. However, these namespace services are created on heterogeneous server platforms, which lead to incompatibility and non-interoperability with respect to management of different namespaces by, e.g., an administrator (user).

In the illustrative embodiment, a namespace and storage management (NSM) server 200 is provided that integrates namespace management and storage management in storage system environment 100. The NSM server 200 includes an integrated management framework that provides an underlying infrastructure that supports various heterogeneous storage access protocols within a single, logical namespace service. To that end, the NSM server cooperates with a NSM console 150 and a remote agent 170 to create the integrated management framework. The integrated management framework, in turn, allows the NSM server 200 to interact with any namespace server, such as a DFS server configured to handle CIFS protocol requests or a NIS server configured to handle NFS protocol requests, directed to namespace services.

Figure 2:
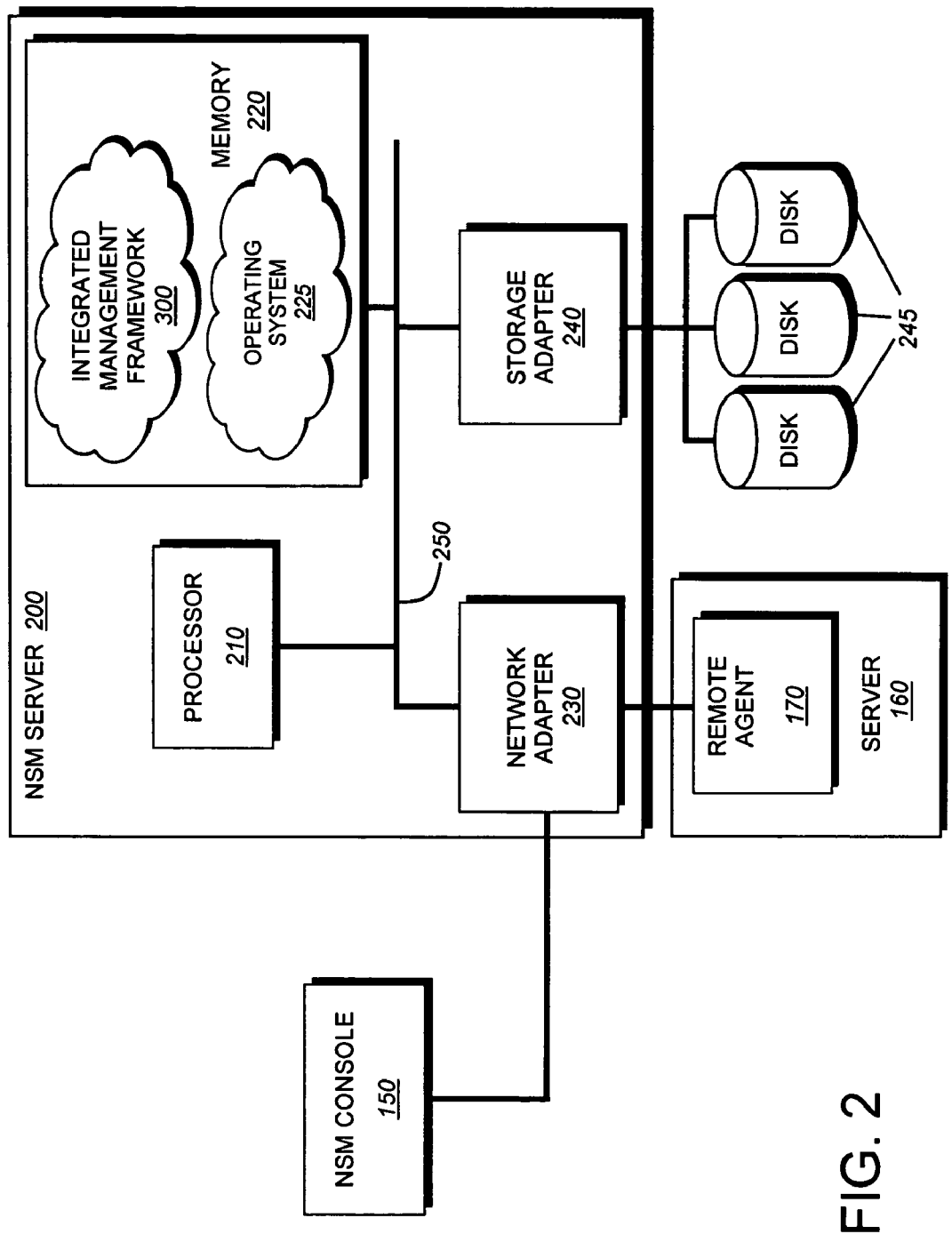
FIG. 2 is a schematic block diagram of an exemplary namespace and storage management server that may be advantageously used with the present invention.

FIG. 2 is a schematic block diagram of an exemplary namespace and storage management (NSM) server 200 that may be advantageously used with the present invention. The NSM server illustratively comprises a processor 210, a memory 220, a network adapter 230 and a storage adapter 240 interconnected by a system bus 250. The memory 220 may comprise storage locations addressable by the processor and adapters for storing software programs, i.e., specific sets of ordered operations, and data structures associated with the invention. The processor and adapters may, in turn, comprise processing elements and/or logic circuitry configured to execute the programs and manipulate the data structures. In particular, the storage adapter 240 comprises the mechanical, electrical and signaling circuitry needed to connect the server to storage devices, such as disks 245. Similarly, the network adapter 230 comprises the mechanical, electrical and signaling circuitry needed to connect the server 200 to, e.g., the NSM console 150 and remote agent 170.

An operating system 225, portions of which is typically resident in memory 220 and executed by the processing elements, functionally organizes the server by, inter alia, invoking operations in support of storage services implemented by the server. In the illustrative embodiment, the operating system is preferably the Windows operating system, although it is expressly contemplated that any appropriate operating system, such as the Unix operating system, may be enhanced for use in accordance with the inventive principles described herein. The operations invoked by the operating system are illustratively namespace and storage operations in support of an integrated management framework 300 provided by the server. It will be apparent to those skilled in the art that other processor and memory means, including various computer readable media, may be used for storing and executing program instructions pertaining to the invention described herein.

B. Integrated Management Framework

Figure 3:
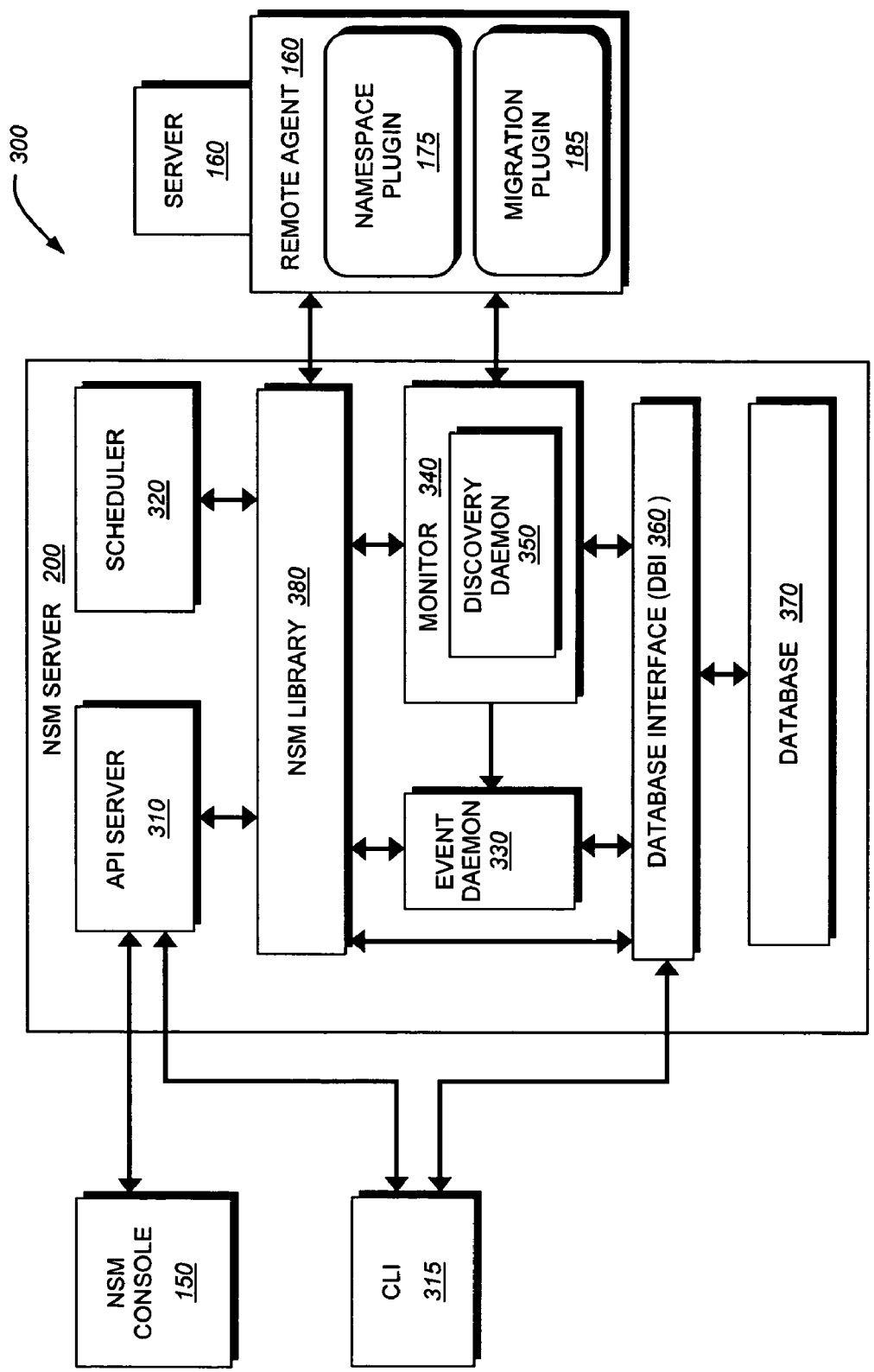
FIG. 3 is a schematic block diagram of an integrated management framework in accordance with the present invention.

The NSM server 200 generally provides its storage services through the execution of software modules, such as processes. These services are illustratively implemented as separately-scheduled processes (and/or daemons) that execute in user space of operating system 225 to provide the integrated management framework 300. As used herein, a process refers to an instance of a program being executed by, e.g., the processor and a thread is an instance of a sequence of the process's program code. FIG. 3 is a schematic block diagram of the integrated management framework 300 in accordance with the present invention. The integrated management framework 300 provides a logical namespace service that is based on extensions to underlying storage management technology and other technological components. Notably, these extensions are embodied as library functionality.

In the illustrative embodiment, the underlying storage management technology is embodied as DataFabric® Manager (DFM) technology available from Network Appliance, Inc., Sunnyvale, Calif. and described in *DataFabric® Manager* 3.2 Administration Guide, 1994-2004, which is hereby incorporated by reference. Broadly stated, the DFM technology comprises a set of coordinating processes, including an application programming interface (API) server 310, a scheduler 320, an Event daemon 330, a Monitor 340 including a Discovery daemon 350 and a database interface (DBI) 360 configured to interact with an embedded database 370. The present invention extends the capabilities of these processes to create the integrated namespace and storage management framework 300 through the addition of NSM library functionality 380. As described herein, the NSM library 380 is illustratively implemented as various library modules, each of which provides namespace and storage management actions embodied as APIs.

The integrated management framework 300 exposes a set of interfaces, e.g., an API interface that is used by the NSM console 150 and a command line interface (CLI 315), used by a communication protocol. Illustratively, the communication protocol is embodied as an XML over HTTP mechanism for APIs, primarily because of its ability to describe data conveyed over the network, as well as the transport, without describing the actual storage access protocol. An example of a communication protocol that may be advantageously used with the present invention is the ZAPI protocol available from Network Appliance, Inc. Such a protocol is also easily extensible and flexibly agnostic to binary formats of specific servers and clients to thereby operate efficiently in a heterogeneous environment.

In the illustrative embodiment, the integrated management framework 300 facilitates configuration and management of pathnames in the logical namespace. That is, the underlying infrastructure of the framework allows a user to manage various pathnames exported by heterogeneous namespace service and protocol implementations within the logical namespace. This aspect of the framework involves creation of a layer of abstraction that presents to a client a notion of the logical namespace that is accessible via a particular storage access protocol. As noted, the various heterogeneous namespace services are not interoperable with respect to user management; the integrated framework 300, as described further herein, extracts logical "views" (e.g., pathnames) from the namespaces exported by the heterogeneous services, stores those pathnames in database 370, and then configures the pathnames so that they are accessible in the logical namespace via the storage access protocol.

In storage and networking environments, some operations can only be executed if a user (such as a system administrator) is logged into a server on which the operations are to be performed, e.g., the NSM server. In other words, a remote operation that is to be invoked on the server 200 can only be performed if the user is logged into the server. The NSM console 150 and remote agent 170 of the integrated management framework 300 address this problem. Illustratively, the NSM console 150 is a component of the framework that includes a JAVA-based interface and the remote agent 170 is a software module installed on a host machine, such as a server 160. Using the communication protocol, the NSM console issues APIs to the NSM server which, in turn, issues APIs that are invoked on the remote agent to perform actions requested by the user.

Essentially, the remote agent 170 is a thin web server that includes "programmatic glue" to enable installation of plug-in modules ("plug-ins") that provide certain functionality of the remote agent. Notably, the remote agent and plug-in module are "pre-installed" on the host machine (i.e., installed during configuration of the machine by, e.g., an administrator) in a manner that is non-obtrusive to operation of the host machine. In contrast, previous systems typically "push" installation of a migration agent on the machine as and when required.

In the illustrative embodiment, plug-in modules include a namespace plug-in 175 that allows remote access and management of data (e.g., pathnames) by the NSM server 200 and, as described further herein, a novel migration plug-in 185 that provides a migration capability of the remote agent 170. The remote agent and plug-ins are illustratively constructed without the use of operating system specific code, and are integrally adapted to operate on various operating system platforms through the use of operating system calls and APIs specific to each platform. For example, a remote agent and plug-in that reside on a Windows host machine use Windows operating systems calls and APIs (e.g., Win32 APIs) to communicate with the host machine. To that end, the remote agent 170 may further comprise an API server that cooperates with an API service on Windows platforms (or a daemon process on Unix platforms) to receive API requests from the NSM server and translate them into host machine calls, such as Win32 APIs or Unix system calls.

It should be noted that the underlying directory data structures used in the logical namespace described herein reside on the namespace server 160 providing the particular namespace service, such as a DFS server. That is, the namespace server 160 implements the basic namespace; the NSM server 200 provides a service for configuring that namespace. To that end, the NSM server 200 cooperates with the remote agent 170 to acquire a copy of the namespace directory structures from the namespace server 160 and stores the copy on the embedded database 370. The NSM server then cooperates with the NSM console 150 to allow a user to manipulate (configure) the copy. Once configuration is complete, the server 200 cooperates with the remote agent to "push" (store) the manipulated copy of directory structures back to the namespace server 160.

The Monitor 340 is illustratively embodied as a multi-threaded process having a collection of individual monitor threads, each of which is scheduled by the scheduler 320. The Monitor 340 cooperates with the remote agent 170 to communicate with one or more machines/devices in the storage system environment 100 (using SNMP, RSH, etc) to collect any type of storage or data/namespace object information (e.g., volume and/or qtree information, as well as information about namespace servers) available in the environment and, to that end, functions as a data collector. Illustratively, each monitor thread is configured to collect information about a particular object in the environment. Extensions to the Monitor are directed to namespace and agent management, each of which is illustratively embodied as an individual monitor thread.

As data is collected, the Monitor 340 determines whether it needs to notify any processes of some resulting condition. For example, an individual monitor thread may detect a threshold and the occurrence of some type of event. As used herein, an event is a synchronous notification with a severity attribute. By configuring thresholds, the NSM server 200 can determine when an event occurs. An example of a threshold is "if volume capacity is greater than 50%, generate an event, out-of-space". If a threshold is exceeded, the Monitor 340 communicates with the Event daemon 330 to notify it of that event. Thus, the Monitor 340 is configured to detect certain events and, in response, generate event notifications to the Event daemon 330. The Event daemon 330 then determines what (if any) further action is needed (e.g., send an SMTP alert, an email, an SNMP trap) and records the event in the embedded database 370.

The embedded database 370 is illustratively implemented as a Sybase relational database that exports a set of Simple Query Language (SQL) function calls that enable storage/retrieval of data, such as namespace objects, to/from the database. A schema of the database is configured to efficiently capture characteristics of a namespace independent of the storage access protocol, such as NFS or CIFS. The database 370 is illustratively organized as a plurality of tables, each of which can be accessed by processes within the NSM server. The DBI 360 is illustratively embodied as a SQL interface to the database and its associated tables, although it will be understood to those skilled in the art that the DBI may be embodied as any other type of database protocol interface depending on the actual implementation of the database, e.g., an Oracle database.

The API server 310 is illustratively embodied as a multi-threaded process that is configured to implement the APIs used by the NSM console 150 to access the database 370 and manipulate information stored thereon. The API server 310 also implements the communication protocol APIs used to interact with the remote agent 170. Accordingly, extensions to the API server 310 are primarily directed to those APIs required to manipulate the database and the remote agent. For example, APIs are invoked by a user (via the NSM console 150) to manipulate (modify, update) the embedded database 370. The API server 310 updates the database with respect to user configuration requests and the Monitor 340 periodically queries (polls) the database for any state/information change. Depending upon the change, the API server may cooperate with the Monitor to instruct data collection from the remote agent 170. After receiving the collected information from the remote agent, the Monitor 340 updates the database and the Event daemon 330.

C. Migration Engine

The present invention relates to a migration engine for use in a logical namespace of a storage system environment. The remote agent 170 of the integrated management framework 300 is installed on a host machine of the storage system environment and includes a pre-installed migration plug-in module 185 that configures the agent as a migration engine adapted to provide a data migration capability. That is, the migration plug-in has the intelligence, e.g., computer readable instructions, to configure the remote agent as a migration engine adapted to perform data migration from a source location to a destination location in the storage system environment.

Using the logical namespace service provided by the NSM server 200, data (e.g., files and/or directories) can be easily moved or "migrated" from a source location of a storage resource (share) to a destination location for the share in connection with a data migration job. Note that the data migration job is an executable entity of a migration policy that is created in accordance with a policy architecture of the integrated management framework 300. An example of a policy architecture that may be advantageously used with the present invention is disclosed in commonly assigned U.S. patent application Ser. No. 11/384,711, titled System and Method for Integrating Namespace Management and Storage Management in a Storage System Environment, which application is hereby incorporated by reference.

The NSM server 200 provides source and destination path locations to the migration engine of a user-selected remote agent 170. These paths are illustratively UNC pathnames directed to, e.g., shares. As described herein, the migration engine may be installed on a source machine hosting the source location of the data migration job, a destination machine hosting the destination location of the job, both machines involved in the data migration job or none of the involved machines. The only requirement is that the migration engine has access to both the source and destination path locations. However, use of a migration engine local to either the source or destination locations may improve performance.

Assume an administrator (user) wants to migrate data from a source location residing on a host machine (e.g., a computer, file server or filer) to a destination location residing another host machine in accordance with a migration policy. Broadly stated, the user interacts with the NSM console 150 to select the source location of the data (i.e., a source share) and destination location of the data (i.e., a destination share) by, e.g., specifying the source and destination locations (share pathnames) of the data migration, along with details of the migration policy. Using the communication protocol, the NSM console then issues APIs to the NSM server 200 which, in turn, issues instructions including, inter alia, a set of APIs that are invoked on the migration engine 400 to initiate data migration.

In response to receiving the instructions, such as source location, destination location and details (e.g., rules) for performing the data migration, the migration engine 400 executes the migration job. As described herein, the migration engine has an internal organization adapted to implement the rules to perform the data migration. For example, the rules of the migration policy may specify reading of the data (file) from the source location and writing it to the destination location, while preserving attributes, type(s) and other information associated with the file(s). The migration engine implements these rules by generating appropriate (e.g., Win32) APIs to instruct appropriate subsystems within its host operating system (e.g., the Windows operating system)

to perform the migration. That is, the migration engine generates the appropriate APIs to instruct a storage system of the host platform to retrieve the file and forward it to a network interface on the Windows platform, where the file data is assembled into packets for transmission over the network to the destination.

Figure 4:
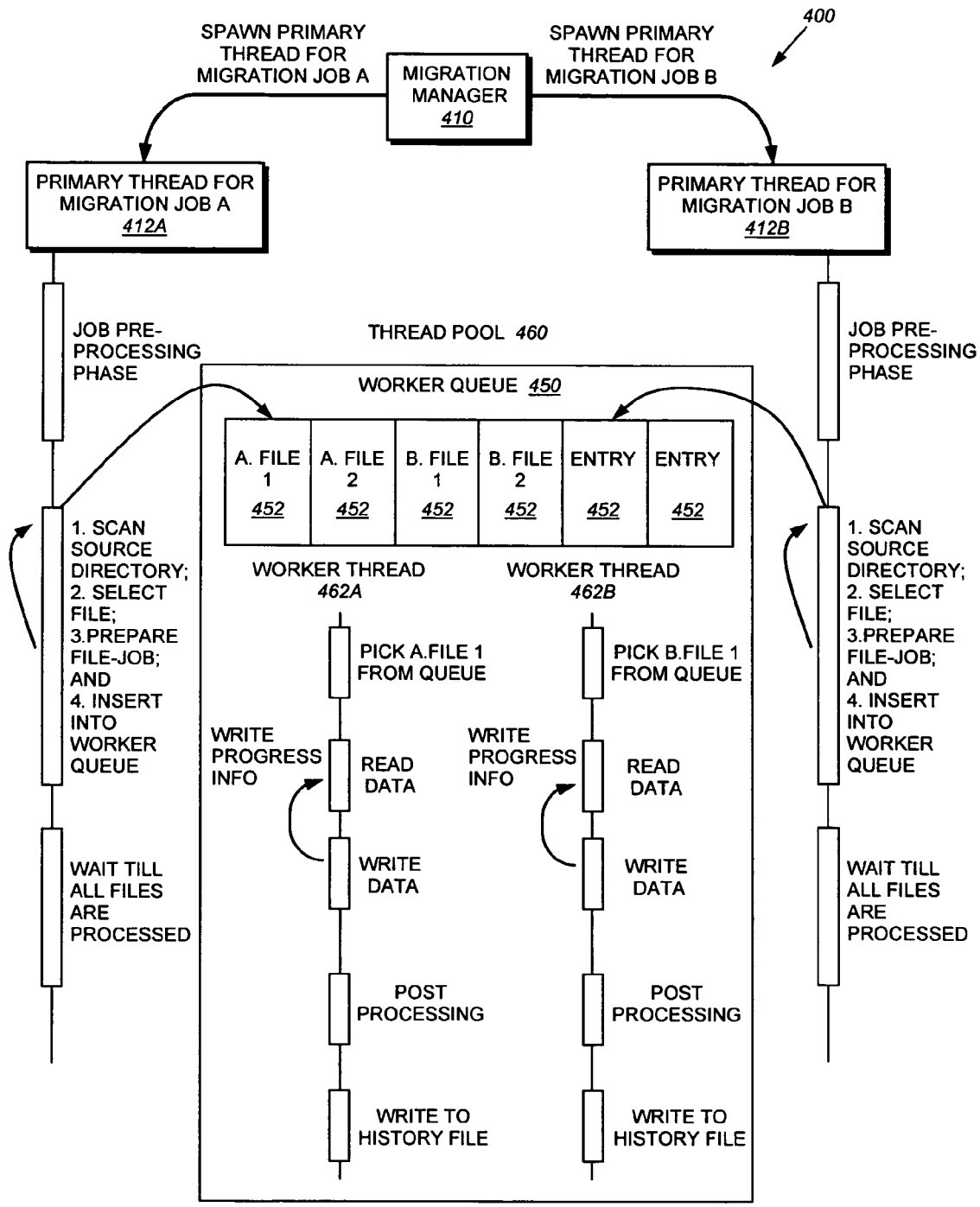
FIG. 4 is a schematic block diagram illustrating the internal organization of a migration engine in accordance with the present invention.

FIG. 4 is a schematic block diagram illustrating the internal organization ("machinery") of a migration engine 400 in accordance with the present invention. The migration engine 400 is illustratively embodied as software code that operates within the context of a remote agent process (e.g., of remote agent 170) and provides an interface between the architecture of the integrated management framework and the architecture of its host machine. Notably, the internal functionality and security machinery of the migration engine (and remote agent 170) facilitates portability to multiple operating system platforms of host machines, including Windows, Unix, and Solaris operating systems, to thereby enable the integrated management framework 300 to manage namespace and storage objects of those machines.

The migration engine 400 illustratively comprises a migration manager 410 configured to manage a global migration worker queue object or structure ("worker queue 450") and a thread pool 460. The migration manager 410, worker queue 450 and thread pool 460 cooperate to move or "migrate" data between machines (computers) by implementing (executing) the rules of the migration policy as defined by one or more data migration jobs. The migration manager 410 may be configured to support execution of multiple migration jobs simultaneously. To that end, the migration manager 410 illustratively embodies a multi-threaded architecture model, although it will be understood to those skilled in the art that the engine may alternatively embody a single-threaded model.

In the single-threaded model, all files/directories are sequentially migrated on a single thread as part of a single migration job. In the multi-threaded model, the files/directories are migrated in parallel on multiple threads. Operationally, the migration manager 410 spawns a first primary thread 412a to handle a first migration job (e.g., job A) and, if appropriate, spawns a second primary thread 412b to handle a second migration job (e.g., job B). Each primary thread 412 then enters a job pre-processing phase wherein the thread (1) scans a source directory at the source location; (2) selects one or more files to be moved; (3) prepares the file for migration in the form of file job, e.g., A.file 1-2 and B.file 1-2; and (4) inserts the file job onto the worker queue 450. The thread 412 then waits until all files are processed.

The worker queue 450 comprises a plurality of slots or entries 452, each of which is configured to accommodate a file job. The worker queue operates within the thread pool 460 comprising a plurality of worker threads 462a,b. Each worker thread 462 selects an appropriate file job from an entry 452 of the queue 450 and executes the migration job by, e.g., retrieving (reading) the corresponding file from the source location and storing (writing) a copy of the file at the destination location. Note that during the reading/writing phase of the migration job, the worker thread 462 records the status of the job in the form of, e.g., progress information. Upon completion of the reading/writing phase, the worker thread 462 then performs post-processing operations and writes the results to, e.g., a history file.

Figure 5:
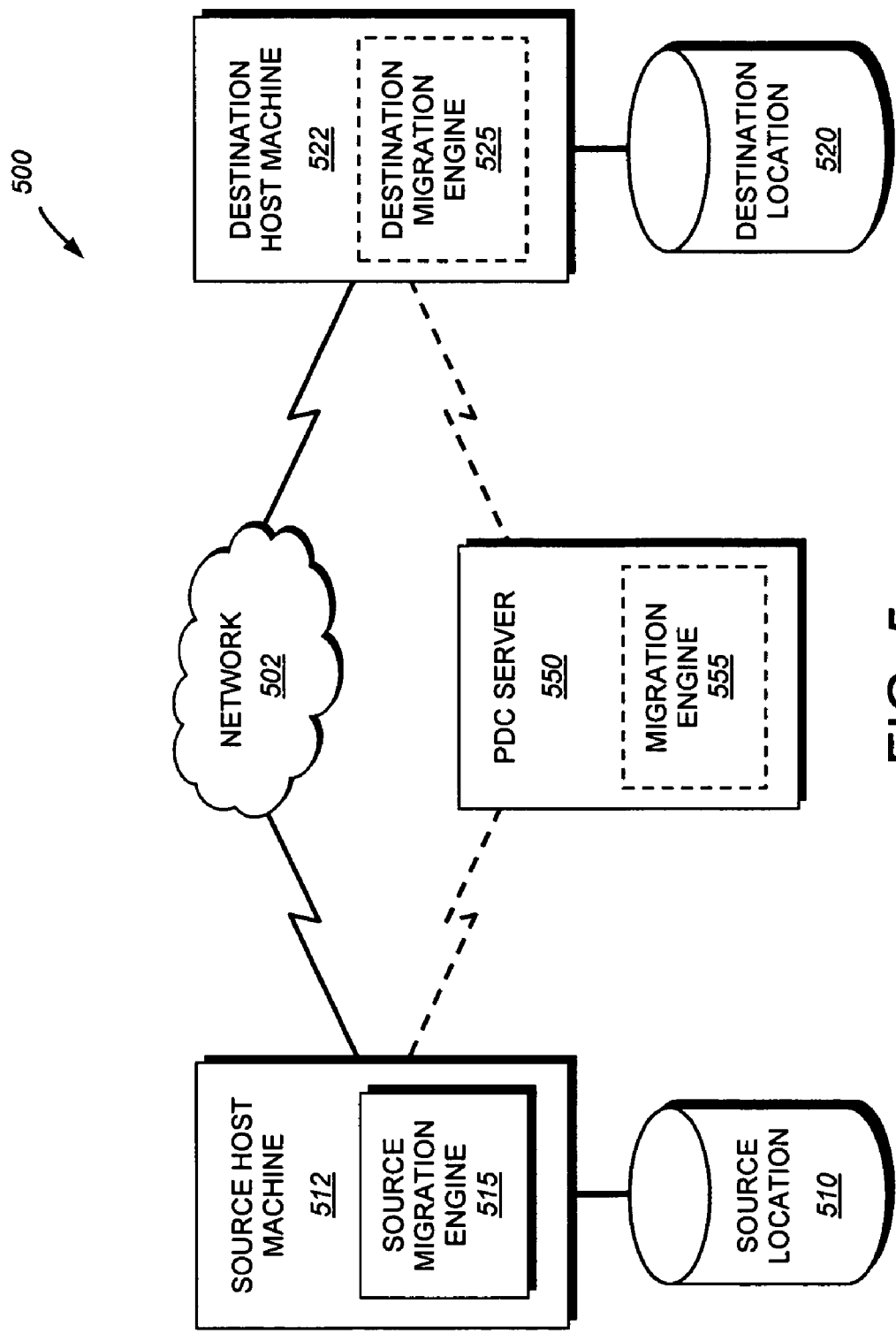
FIG. 5 is a schematic block diagram illustrating the use of the migration engine to perform data migration in an exemplary heterogeneous storage system environment.

FIG. 5 is a schematic block diagram illustrating the use of the migration engine to perform data migration in an exemplary heterogeneous storage system environment. Note that the migration engine illustratively performs data migration by implementing a migration policy as defined by a data migration job. A single migration engine may be used to perform a data migration operation from a machine hosting a source share at a source location to a machine that stores the migrated share (a destination share) at a destination location in the heterogeneous storage system environment 500. Assume that the migration engine resides on a source host machine 512 running the Windows operating system and exporting the source share at the source location 510, i.e., the migration engine is a source migration engine 515. Assume further that the destination location 520 of the migration job is a destination host machine 522 running the Unix operating system. The source migration engine 515 is configured (with requisite privileges) to issue appropriate system calls and Win32 APIs to various sub-systems on the Windows machine in order to retrieve a copy of the source share (file) from the source location and move it over network 502 to the destination location 520.

In an alternate embodiment, a second, destination migration engine 525 is installed on the Unix host machine 522. Here, the destination migration engine 525 is configured (with requisite privileges) to communicate with the source migration engine 515 on the Windows host machine 512 using, e.g., APIs in accordance with the communication protocol, to enable transfer of the data copy from the source location 510 to the destination location 520. The destination migration engine 525 is further configured to issue appropriate Unix system calls and APIs to various sub-systems on the Unix machine 522 in order to store the transferred data at the destination location 520.

When selecting the migration policy, an administrator (user) can choose one or more options that control the migration operation. These options include, among others, (i) updating namespace links as part of the migration job; (ii) specifying whether the migration is a copy-paste or copy-paste-delete operation; and (iii) providing filters (inclusion/exclusion lists) for the migration job where the files/directories are selected based on specified criteria, such as name, size and/or access time. In addition, the user can choose one or more pre-migration options that specify whether the migration engine should abort the migration job or generate a warning (e.g., an error message) when scanning for potential (e.g., file permission related) problems moving (e.g., copying) the data and/or running a pre-migration batch script.

Furthermore, the user can specify whether to strictly preserve all metadata, i.e., attributes, type(s) and information associated with the data (e.g., one or more files). In other words, the user can specify whether it can endure any metadata loss associated with the file. Note that, in this context, the attributes include security attributes, such as access control lists (ACLs), while the type(s) of file include (i) sparseness of the file and/or (ii) encryption of the file, and the information associated with the file includes alternate data streams (ADS).

When copying a file between similar operating system platforms, it is fairly easy to preserve the attributes, type(s) and file associations at the destination location. For example, the ACLs, ADS and file attributes are exactly copied from the source to destination locations. However, preserving such attributes, type(s) and associated information may be problematic when copying the file between heterogeneous operating system and/or file system platforms. The migration engine may be adapted to address this problem by retrieving the file from the source location and translating its attributes, type(s) and associated information to a format compatible with the destination platform "on-the-fly" (dynamically) for storage on the destination location.

If a single migration engine (e.g., source migration engine 515) is used to copy data between the different platforms, the engine 515 must be configured with information pertaining to, e.g., the required formats of the attributes on the source and destination locations 510, 520 in order to dynamically perform format translation. Otherwise, if two migration engines (e.g., source migration engine 515 and destination migration engine 525) are used, each engine is configured with information pertaining to the required format of the file attributes on its resident source or destination platform. Note that the migration engine illustratively supports a "best effort" mode that performs the data migration job in spite of security information losses, file metadata losses, etc.

Illustratively, data flows through a machine hosting the migration engine which, in an embodiment of the invention, may be a machine other than the source or destination machines. For example, the migration engine (e.g., migration engine 555) may be installed on a machine hosting a domain controller (e.g., a PDC server 550) of the environment 500. Of course, it will be understood to those skilled in the art that data flow could occur directly between the source and destination machines. If the attributes of the file are to be strictly preserved, the migration engine checks those attributes and alerts the user as to whether they are preserved. Moreover, if the source machine 512 implements a Windows operating system platform and the destination machine 522 implements a Unix operating system platform, then the migration engine 555 on the PDC server 550 performs the appropriate format translations on-the-fly. Here, the migration engine communicates with a CIFS server (not shown) of the operating system on the source machine using, e.g., Win32 API remote procedure calls (RPCs) over the network and with a NFS server (not shown) of the operating system on the destination machine using Unix system RPCs. Both of these servers communicate internally with their corresponding network and storage subsystems to affect the data transfers over the network and onto the disks of their machines.

Figure 6:
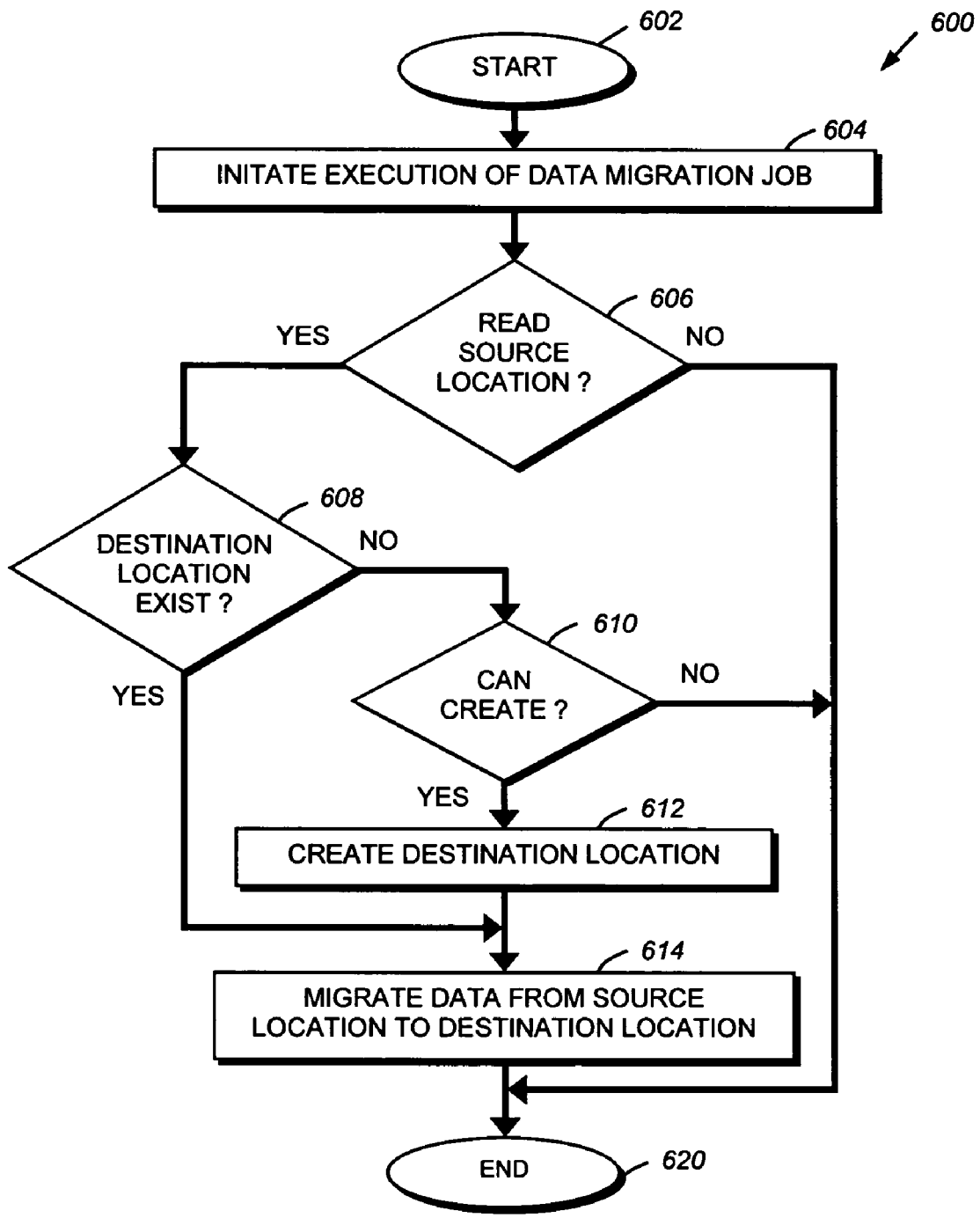
FIG. 6 is a flowchart illustrating operation of the migration engine in accordance with the present invention.

FIG. 6 is a flowchart illustrating operation of the migration engine in accordance with the present invention. The procedure 600 starts at Step 602 and proceeds to Step 604 where the migration engine initiates execution of the data migration job in response to instructions received from the NSM server. Note that the instructions include, inter alia, the source machine hosting the source location of the data (share) to be migrated, the destination machine hosting the destination location for the migrated share and details a) (e.g., rules) for performing the data migration. In Step 606, the migration engine determines whether it can retrieve (read) the share from the source location. If not, the procedure ends at Step 620. If the engine can read the share, the procedure proceeds to Step 608 where the migration engine determines whether the destination location for the migrated share exists. If not, the migration engine determines whether the destination location for the share can be created in Step 610. If not, the procedure ends at Step 620. However, if the destination share location can be created, the migration engine cooperates with the NSM server to create that location for the share at Step 612.

In Step 614, the migration engine executes the migration job to migrate the share (data) from the source location to the destination location. Note that if the source and destination machines have heterogeneous platforms (i.e., the operating systems and/or file systems of the machines are different), the migration engine further determines whether the job allows a loss of metadata when copying the share between the heterogeneous platforms. For example, security information (ACLs) and ADS information may be lost when copying data from a Windows NT file system (NTFS) platform to a non-NTFS platform. In addition, some file attributes (such as archival attributes) may be lost when copying data between such platforms. Moreover, other disparities may arise after copying the data to the destination machine; for example, encrypted files on the source file system platform may end up as non-encrypted files on the destination file system platform if the latter does not support encrypted files. If the loss of metadata is not allowed, the migration engine executes the migration job by, among other things, performing the appropriate format translations on-the-fly. The procedure then ends at Step 620.

When specifying the migration policy, the user is prompted by the NSM console 150 to select the manner in which data is to be copied during a copy phase of the data migration job. For example, the data can be copied from the source location to the destination location, with the data being either deleted from the source location or maintained at the source location. In the illustrative embodiment, copy-paste and copy-paste-delete options for data migration are provided for selection by the user. In copy-paste, the original files at the source machine are retained, whereas in copy-paste-delete, those original files are deleted at the source location upon successful completion of data migration. For both options during the copy phase, a copy-in-place option is provided. Copy-in-place, as used herein, denotes overwriting of the files at the destination location when the same file exists at both the source and destination locations.

According to an aspect of the present invention, the migration engine reduces the probability of data corruption occurring during data migration by storing a copy of data (e.g., a file) transferred from the source location in a temporary area on the destination location and changing the original name of the transferred file copy. Once the data migration transfer is complete, the file is renamed to its original file name and the file copy is stored at the permanent destination location. Renaming of the file is an atomic operation that protects against failures/crashes corrupting the data in the file. For example, if the migration engine fails, the data stored in the temporary area is deleted. Once the migration engine is restored, a new data migration transfer is started, thus reducing the possibility of inconsistent data on the destination location.

Figure 7:
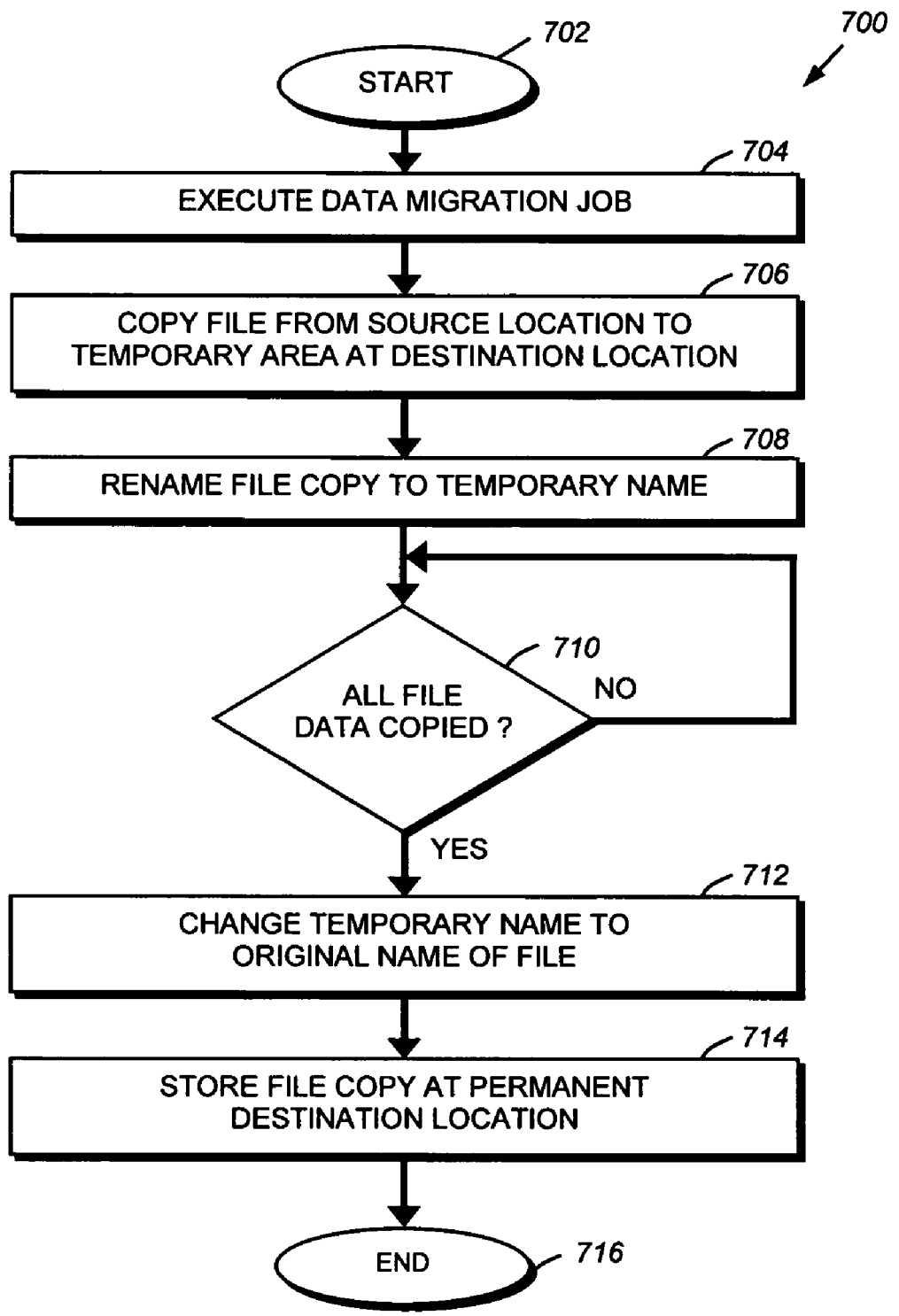
FIG. 7 is a flowchart illustrating a procedure for migrating data using the migration engine in accordance with the present invention.

FIG. 7 is a flowchart illustrating a procedure for migrating data using the migration engine in accordance with the present invention. The procedure 700 starts at Step 702 and proceeds to Step 704 where the migration engine executes a data migration job. In Step 706, the migration engine copies data of an original file (file X) from a source location to a temporary area at a destination location and, in Step 708, renames the file copy to a different temporary file name (file Y). Once all of the file data is copied to that area (Step 710), the migration engine performs a rename operation to change the temporary name (file Y) to the original file name (file X) in Step 712 and, in Step 714, stores the file copy at the permanent destination location. Note that if a copy-in-place option is selected, an existing file on the destination location is removed once all of the data is copied to the temporary area. The procedure then ends at Step 716. Advantageously, the temporary storage area and file renaming technique are used because the migration engine transfers the data in a "cut-through" manner (i.e., without storing the data at the machine hosting the migration engine). This aspect of the invention thus ensures the consistency of the data (i.e., that the existing data is not modified during the transfer).

While there has been shown and described an illustrative embodiment of a migration engine for use in a logical namespace of a storage system environment, it is to be understood that various other adaptations and modifications may be made within the spirit and scope of the invention. For example, another aspect of the invention is directed to the format and content of information recorded (logged) by the migration engine during data migration. The migration engine also has the capability of controlling the amount of information that is logged during data migration. The novel logging format provides an intelligent manner of logging information that can be used by an administrator (user) to precisely determine the cause of a failure arising during migration. As a result, the content of the logging information may be particularly useful for auditing purposes.

In the illustrative embodiment, the XML language is used to record the logging information in specific headers that provide a detailed audit trail of the migration job. XML is a platform-independent protocol that can be easily ported to any platform in the heterogeneous storage system environment. FIG. 8 is a diagram of an exemplary format 800 of information logged by the migration engine in accordance with the present invention. Note that previous systems utilize platform specific tools, such as the Windows event viewer, to record information. In contrast, this aspect of the invention provides a user-friendly format that can be used with any operating system and file system platform of the heterogeneous environment.

The foregoing description has been directed to specific embodiments of this invention. It will be apparent, however, that other variations and modifications may be made to the described embodiments, with the attainment of some or all of their advantages. For instance, it is expressly contemplated that the procedures, processes and/or modules described herein may be implemented in hardware, software, embodied as a computer-readable medium having program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system, comprising:
a processor configured to execute at least one remote agent, the at least one remote agent, when executed, configured to store a copy of data transferred from a source computer to a destination computer, wherein the copy is stored on a storage device at a temporary area on the destination computer;
the remote agent further configured to change a first name of the transferred data to a second name;
the remote agent further configured to determine if the data transfer from the source computer to the destination computer is complete; and
the remote agent further configured to change the second name of the transferred data to the first name in response to determining the data transfer is complete, wherein the change from the second name to the first name is atomic.

2. The system of claim 1 wherein the remote agent is software code configured to operate within a context of a remote agent process.

3. The system of claim 1 wherein the remote agent is further configured to provide an interface between an architecture of an integrated management framework and an architecture of a host machine of the system.

4. The system of claim 1 wherein internal functionality and security machinery of the remote agent facilitates portability to multiple operating system platforms of host machines of the system to thereby enable an integrated management framework to manage namespace and storage objects of the host machines.

5. A method, comprising:
storing a copy of data transferred from a source computer to a destination computer, wherein the copy is stored on a storage device at a temporary area on the destination computer;
changing a first name of the transferred data to a second name;
determining if the data transfer from the source computer to the destination computer is complete; and
changing the second name of the transferred data to the first name in response to determining the data transfer is complete, wherein the change from the second name to the first name is atomic.

6. The method of claim 5 further comprising:
retrieving the data from the source computer; and
translating information of the data to a format compatible with the destination computer.

7. The method of claim 5 further comprising:
deleting the copy of data stored in the temporary area in response to determining that a remote agent has failed during the data transfer; and
starting a new data transfer after the remote agent is restored.

8. The method of claim 7 further comprising recording information during the data transfer and using the recorded information to determine a cause of the remote agent failure.

9. The method of claim 5 further comprising:
selecting copy-paste-delete as a manner in which the data is to be transferred.

10. The method of claim 5 wherein the storage device comprises a disk.

11. An apparatus configured for use in a storage system environment, comprising:
means for storing a copy of data transferred from a source computer to a destination computer, wherein the copy is stored on a storage device at a temporary area on the destination computer;
means for changing a first name of the transferred data to a second name;
means for determining if the data transfer from the source computer to the destination computer is complete; and
means for changing the second name of the transferred data to the first name in response to determining the data transfer is complete, wherein the change from the second name to the first name is atomic.

12. The apparatus of claim 11 further comprising:
means for retrieving the data from the source computer; and
means for translating information of the data to a format compatible with the destination computer.

13. The apparatus of claim 11 further comprising:
means for deleting the copy of data stored in the temporary area in response to determining that a remote agent has failed during the data transfer; and
means for starting a new data transfer after the remote agent is restored.

14. The apparatus of claim 13 further comprising means for recording information during the data transfer and using the recorded information to determine a cause of the remote agent failure.

15. The apparatus of claim 11 further comprising:
means for selecting copy-paste-delete as a manner in which the data is to be transferred.

16. The apparatus of claim 11 wherein the storage device comprises a disk.

17. A non-transitory computer readable medium containing executable program instructions for execution by a processor, comprising:
program instructions that store a copy of data transferred from a source computer to a destination computer, wherein the copy is stored on a storage device at a temporary area on the destination computer;
program instructions that change a first name of the transferred data to a second name;
program instructions that determine if the data transfer from the source computer to the destination computer is complete; and
program instructions that change the second name of the transferred data to the first name in response to determining the data transfer is complete, wherein the change from the second name to the first name is atomic.

18. The non-transitory computer readable medium of claim 17 further comprising:
program instructions that retrieve the data from the source computer; and
program instructions that translate information of the data to a format compatible with the destination computer.

19. The non-transitory computer readable medium of claim 17 further comprising:
program instructions that delete the copy of data stored in the temporary area in response to determining that a remote agent has failed during the data transfer; and
program instructions that start a new data transfer after the remote agent is restored.

20. The non-transitory computer readable medium of claim 19 further comprising program instructions that record information during the data transfer and use the recorded information to determine a cause of the remote agent failure.

21. The non-transitory computer readable medium of claim 17 wherein the storage device comprises a disk.

22. The system of claim 1 further comprising:
the remote agent further configured to retrieve the data from the source computer and further configured to translate information of the data to a format compatible with the destination computer.

23. The system of claim 1 further comprising:
the destination computer configured to delete the copy of data stored in the temporary area in response to determining that the remote agent has failed during the data transfer; and
the remote agent further configured to start a new data transfer after the remote agent is restored.

24. The system of claim 1 wherein the agent is further configured to record information during the data transfer, wherein the recorded information is used to determine a cause of a remote agent failure.

25. The system of claim 1 further comprising:
a copy-paste-delete policy configured as a migration policy in which the data is to be transferred.

26. The system of claim 1 wherein the storage device comprises a disk.

* * * * *

UNITED STATES PATENT AND TRADEMARK OFFICE
CERTIFICATE OF CORRECTION

| | |
|---|---|
| PATENT NO. | : 8,285,817 B1 |
| APPLICATION NO. | : 11/384804 |
| DATED | : October 9, 2012 |
| INVENTOR(S) | : Shankar Balasubramanian |

It is certified that error appears in the above-identified patent and that said Letters Patent is hereby corrected as shown below:

Col. 1, line 34 should read: "storage area network and a disk assembly directly ~~attacked~~attached to"

Col. 2, line 36 should read: "between a file server and ~~cliff~~client accessing a shared storage"

Col. 13, line 44 should read: "location for the migrated share and details ~~a)~~ (e.g., rules) for"

Signed and Sealed this

Fifteenth Day of January, 2013

David J. Kappos
*Director of the United States Patent and Trademark Office*